(12) United States Patent
Bouchard et al.

(10) Patent No.: US 8,826,669 B2
(45) Date of Patent: Sep. 9, 2014

(54) GAS TURBINE EXHAUST CASE

(75) Inventors: Richard Bouchard, Sorel-Tracy (CA); John Pietrobon, Outremont (CA); Eric Durocher, Vercheres (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 385 days.

(21) Appl. No.: 13/292,289

(22) Filed: Nov. 9, 2011

(65) Prior Publication Data

US 2013/0111906 A1    May 9, 2013

(51) Int. Cl.
| | | |
|---|---|---|
| F02C 7/08 | (2006.01) | |
| F03G 1/00 | (2006.01) | |
| F02G 3/00 | (2006.01) | |
| F02K 1/82 | (2006.01) | |
| F02C 7/24 | (2006.01) | |

(52) U.S. Cl.
CPC .. *F02K 1/827* (2013.01); *F02C 7/24* (2013.01)
USPC ........................... 60/770; 415/211.2; 181/213

(58) Field of Classification Search
USPC ............. 60/39.01, 226.1, 262, 263, 770, 271; 415/137–139, 211.2; 181/213
See application file for complete search history.

(56) References Cited

U.S. PATENT DOCUMENTS

| | | |
|---|---|---|
| 2,681,788 A | 6/1954 | Wosika |
| 3,028,141 A | 4/1962 | Nichols |
| 3,071,346 A | 1/1963 | Broffitt |
| 3,511,577 A | 5/1970 | Karstensen |
| 3,730,292 A | 5/1973 | MacDonald |
| 4,106,587 A | 8/1978 | Nash et al. |
| 4,137,992 A | 2/1979 | Herman |
| 4,226,297 A | 10/1980 | Cicon |
| 4,384,822 A | 5/1983 | Schweikl et al. |
| 4,391,565 A | 7/1983 | Speak |
| 4,433,751 A | 2/1984 | Bonneau |
| 4,639,189 A | 1/1987 | Rosman |
| 4,756,153 A | 7/1988 | Roberts et al. |
| 4,889,469 A | 12/1989 | Wilkinson |
| 4,926,963 A | 5/1990 | Snyder |
| 4,947,958 A | 8/1990 | Snyder |
| 4,989,406 A | 2/1991 | Vdoviak et al. |
| 5,060,471 A | 10/1991 | Torkelson |
| 5,167,118 A | 12/1992 | Torkelson |
| 5,269,651 A | 12/1993 | Ostermeir et al. |
| 5,357,744 A * | 10/1994 | Czachor et al. ................ 60/799 |
| 5,423,658 A * | 6/1995 | Pla et al. ........................ 415/118 |
| 5,653,580 A | 8/1997 | Faulder et al. |
| 5,715,672 A | 2/1998 | Schockemoehl et al. |

(Continued)

OTHER PUBLICATIONS

Broszat, Dominik et al., "Validation of an Integrated Acoustic Absorber in a Turbine Exit Guide Vane", American Institute of Aeronautics and Astronautics/CEAS Aeroacoustics Conference, Jun. 5-8, 2011, Portlant Oregon, p. 1-7.

*Primary Examiner* — Hoang Nguyen
(74) *Attorney, Agent, or Firm* — Norton Rose Fulbright Canada LLP

(57) ABSTRACT

A turbine exhaust case for a turbofan engine comprises a plurality of arcuate acoustic panels assembled into a circumferentially extending inner shroud with circumferential gaps between adjacent acoustic panels. An outer shroud extends circumferentially about the inner shroud. The inner shroud and the outer shroud define an annular gaspath therebetween. A plurality of circumferentially spaced-apart exhaust struts extends radially across the annular gaspath and structurally connects the individual acoustic panels forming the inner shroud to the outer shroud.

17 Claims, 4 Drawing Sheets

(56) References Cited

U.S. PATENT DOCUMENTS

| | | | |
|---|---|---|---|
| 5,775,095 A * | 7/1998 | Zysman et al. | 60/204 |
| 5,979,593 A * | 11/1999 | Rice et al. | 181/207 |
| 6,263,998 B1 | 7/2001 | Schockemoehl et al. | |
| 6,547,518 B1 | 4/2003 | Czachor et al. | |
| 6,584,766 B1 | 7/2003 | Czachor | |
| 7,000,406 B2 | 2/2006 | Markarian et al. | |
| 7,100,358 B2 * | 9/2006 | Gekht et al. | 60/39.5 |
| 7,172,388 B2 * | 2/2007 | Synnott | 415/135 |
| 7,246,995 B2 | 7/2007 | Zborovsky | |
| 7,337,875 B2 | 3/2008 | Proscia et al. | |
| 7,604,095 B2 | 10/2009 | Mitchell | |
| 7,784,283 B2 | 8/2010 | Yu et al. | |
| 7,819,224 B2 | 10/2010 | Borchers et al. | |
| 7,836,702 B2 | 11/2010 | Grivas et al. | |
| 7,886,543 B2 | 2/2011 | Vincent | |
| 7,891,195 B2 | 2/2011 | Bouty et al. | |
| 7,950,236 B2 | 5/2011 | Durocher et al. | |
| 7,954,596 B2 | 6/2011 | Schulze et al. | |
| 2006/0010852 A1 | 1/2006 | Gekht et al. | |
| 2011/0108357 A1 | 5/2011 | Vauchel et al. | |
| 2011/0126544 A1 | 6/2011 | Foster | |
| 2011/0167786 A1 * | 7/2011 | Marques et al. | 60/204 |

* cited by examiner

GAS TURBINE EXHAUST CASE

TECHNICAL FIELD

The application relates generally to gas turbine engines and, more particularly, to a gas turbine exhaust case of a turbofan engine.

BACKGROUND OF THE ART

Turbine exhaust cases come in many different constructions. Sheet metal turbine exhaust cases typically comprise sheet metal inner and outer shrouds structurally interconnected by a plurality of circumferentially spaced-apart sheet metal hollow struts. The same sheet metal material is typically used for all the parts of the exhaust case to avoid thermal and structural mismatch, among other things. It is desirable for the outer shroud and the inner shroud to generally have the same stiffness to avoid shroud deformation in response to the thermal growth of the struts. These thermal and stress constraints together with the need for lightweight materials have limited the choices available in the construction of sheet metal turbine exhaust cases.

SUMMARY

In one aspect, there is provided a turbine exhaust case for a turbofan engine having an axis, the turbine exhaust case comprising a radially outer annular shroud and a radially inner annular shroud concentrically mounted about said axis and defining therebetween an annular gaspath for channeling hot gases received from a turbine section of the engine, a plurality of circumferentially spaced-apart turbine exhaust struts extending radially across the gaspath between the radially outer and the radially inner annular shrouds, at least the radially inner shroud being circumferentially segmented into a plurality of separate arcuate panels, the exhaust struts being mounted to said separate arcuate panels, the panels being movable relative to each other to provide for thermal expansion/contraction of the radially inner annular shroud in response to thermally induced movement of the turbine exhaust struts.

In a second aspect, there is provided a turbine exhaust case for a turbofan engine, comprising a plurality of arcuate acoustic panels assembled into a circumferentially extending inner shroud with circumferential gaps between adjacent acoustic panels, an outer shroud extending circumferentially about the inner shroud, the inner shroud and the outer shroud defining an annular gaspath therebetween, and a plurality of circumferentially spaced-apart exhaust struts extending radially across the annular gaspath and structurally connecting the acoustic panels of the inner shroud to the outer shroud.

In a third aspect, there is provided a turbine exhaust case for a turbofan engine, comprising a unitary annular outer shroud surrounding a segmented inner shroud including individual acoustic panels disposed circumferentially adjacent to one another with a circumferential play between adjacent acoustic panels, the outer shroud and the inner shroud having a different stiffness, and a plurality of circumferentially spaced-apart exhaust struts connected at a radially inner end thereof to said individual acoustic panels and at a radially outer end thereof to said outer shroud.

DESCRIPTION OF THE DRAWINGS

Reference is now made to the accompanying figures, in which.

DETAILED DESCRIPTION

Figure 1:
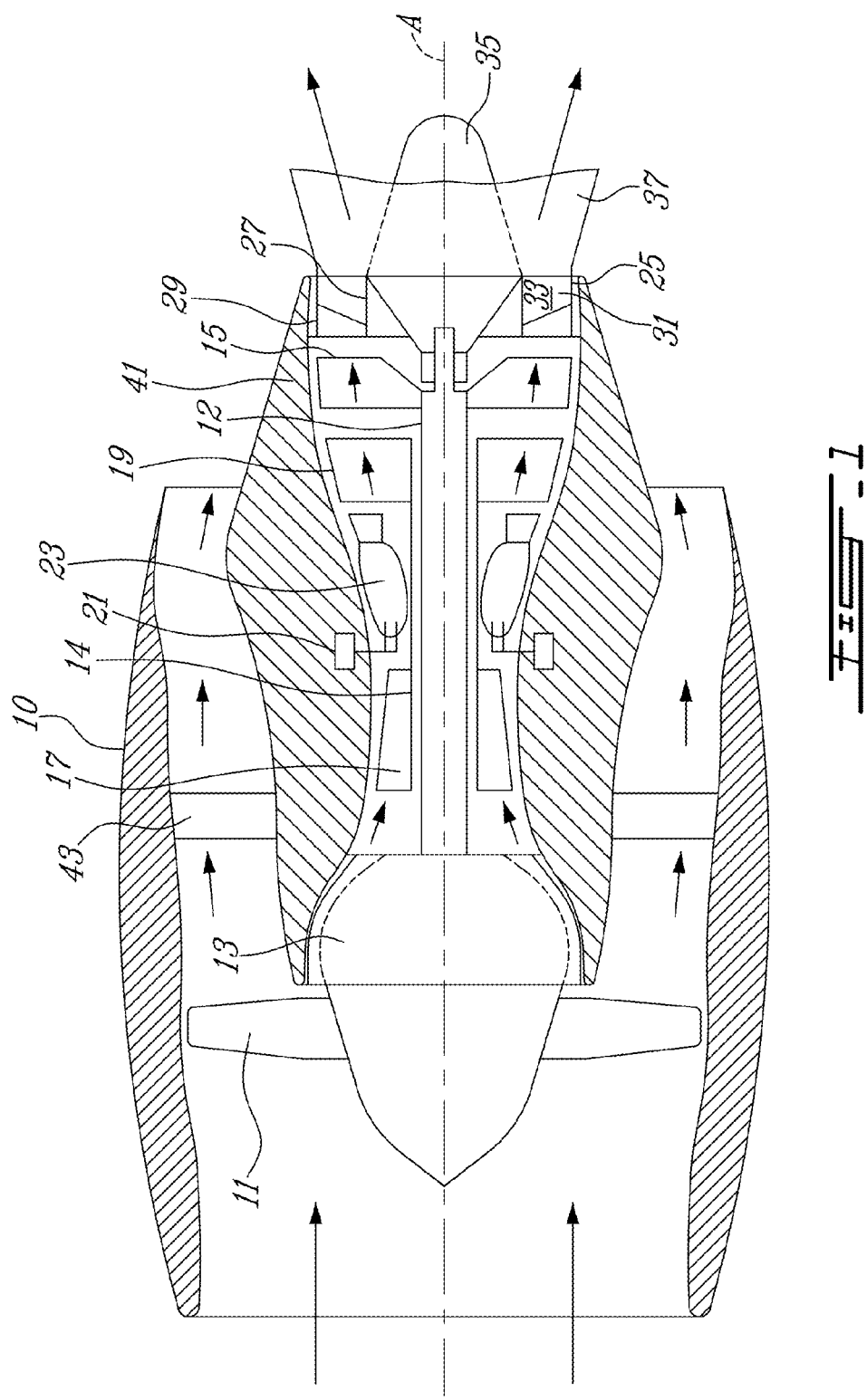
FIG. 1 is a schematic cross-section view of a gas turbine engine.

FIG. 1 illustrates an example of a turbofan gas turbine engine generally comprising a housing or nacelle 10; a low pressure spool assembly 12 including a fan 11, a low pressure compressor 13 and a low pressure turbine 15; a high pressure spool assembly 14 including a high pressure compressor 17, and a high pressure turbine 19; and a combustor 23 including fuel injecting means 21.

Figure 2:
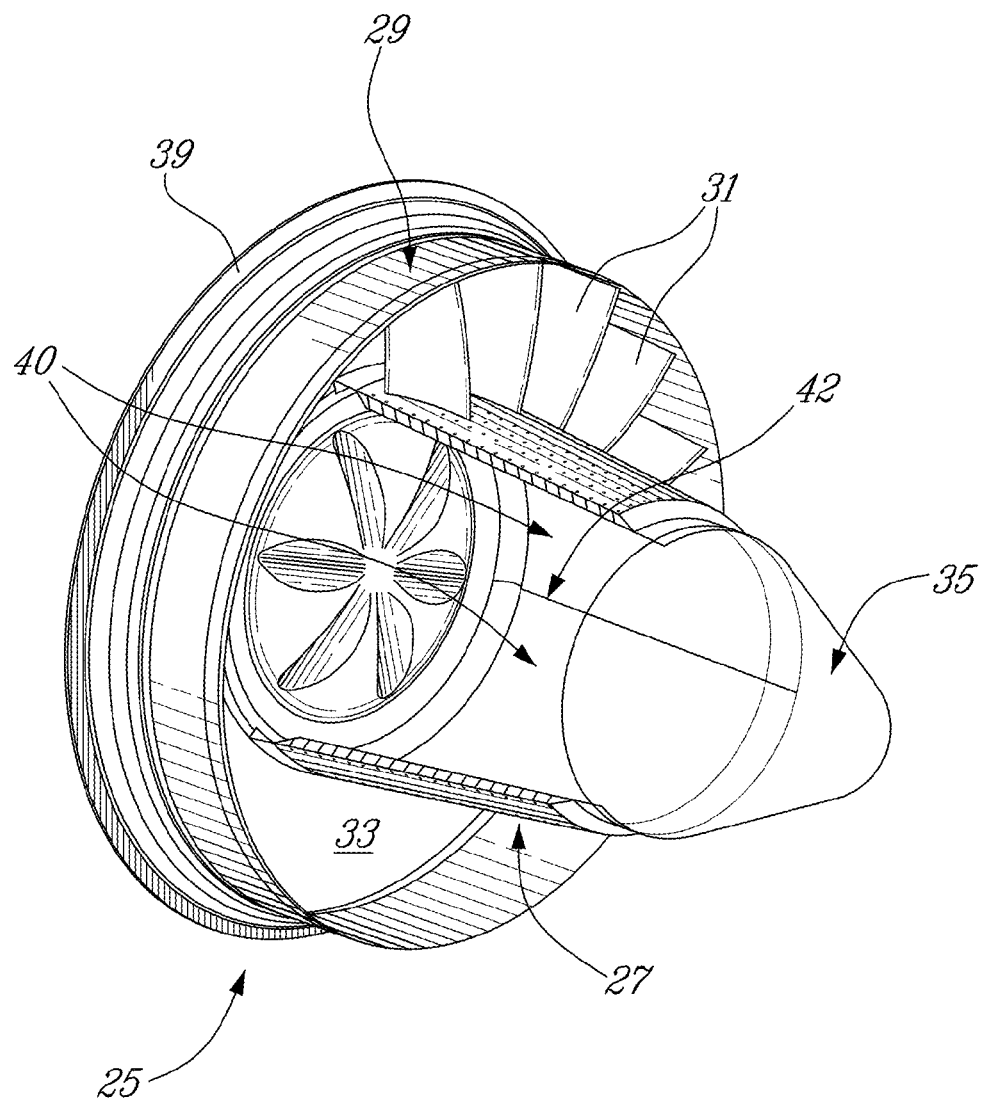
FIG. 2 is an isometric view of a turbine exhaust case, the mixer typically attached to the outer shroud of the case as well as one circumferential segment of the inner shroud of the exhaust case being omitted for clarity purposes.
Figure 3:
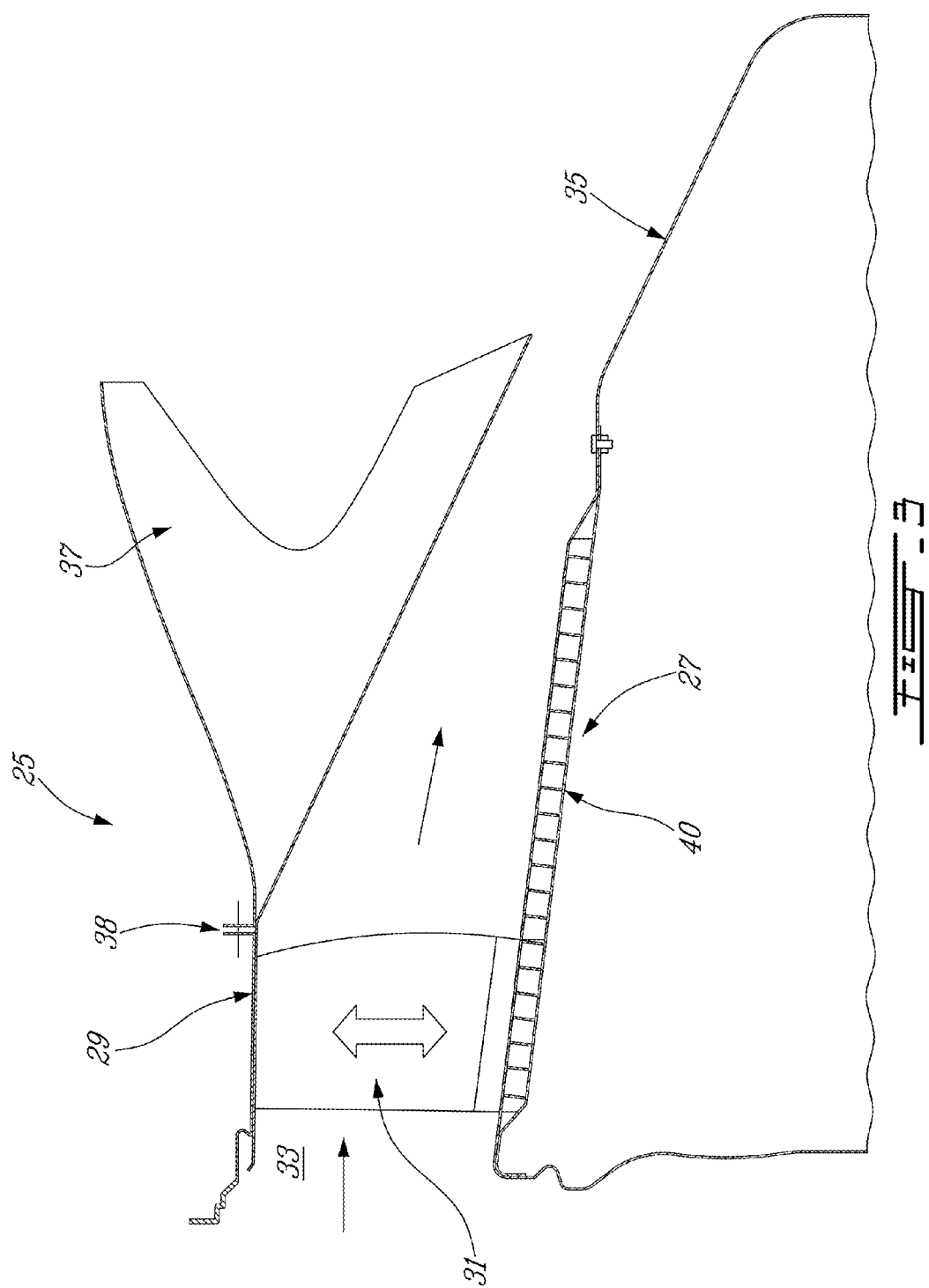
FIG. 3 is a schematic cross-section of the turbine exhaust case.

Referring to FIGS. 1 to 3, the gas turbine engine further comprises a turbine exhaust case 25 disposed immediately downstream of the last stage of low pressure turbine blades for receiving hot gases from the low pressure turbine 15 and exhausting the hot gases to the atmosphere. The turbine exhaust case 25 may comprise an annular inner shroud 27 concentrically mounted about the central axis A (FIG. 1) of the engine, an annular outer shroud 29 concentrically mounted about the central axis A of the engine and the inner shroud 27, a plurality of circumferentially spaced-apart struts 31 extending radially between the inner and outer shrouds 27, 29, thereby structurally connecting same. The struts 31 may not only serve as structural components, they may have an airfoil profile to serve as vanes for directing the incoming flow of hot gases. The struts 31 are also typically hollow to provide an internal passageway for lubrication lines and the like. As shown in FIGS. 1 and 3, a multi-lobed mixer 37 may be attached to the aft end of the outer shroud 29. As depicted at 38 in FIG. 3, a flange connection may be provided for allowing the mixer 37 to be bolted to the outer shroud 29 of the turbine exhaust case 25. A mounting flange 39 (FIG. 1) may also be provided at the front end of the outer shroud 29 for securing the turbine exhaust case 25 to the engine case 41 (FIG. 1) which, in turn, may be structurally connected to the nacelle 10 through a plurality struts 43 (FIG. 1) extending radially through the bypass passage of the engine. The outer shroud 29 may comprise an intermediate sheet metal ring section mounted between front and rear forged or cast flange portions. The struts 31 are typically secured to the intermediate sheet metal ring section. Referring to FIGS. 1 to 3, it may also be appreciated that a tail cone 35 may be mounted to the aft end of the inner shroud 27 of the turbine exhaust case 25. The tail cone may be bolted or other suitably connected to the inner shroud 27.

In operation, combustion gases discharged from the combustor 23 power the high and low pressure turbines 19 and 15, and are then exhausted into the annular gaspath 33 defined between the inner and outer shrouds 27, 29 of the turbine exhaust case 25. The tangential components included in the exhaust gases may be de-swirled by the struts 31 or similar de-swirling airfoil structures integrated in the turbine exhaust case 25, and then the exhaust gases are discharged into the atmosphere through the mixer 37 which facilitates the mixing of the exhaust gases with the outer air flow from the bypass passage.

Referring now more specifically to FIGS. 2 and 3, it can be appreciated that inner shroud 27 may be circumferentially segmented. According to the illustrated embodiment, the inner shroud 27 is made out of a plurality (i.e. at least two) of separate/individual arcuate panels 40 assembled into a circumferentially extending band with circumferential gaps or plays 42 between adjacent panels allowing for expansion and contraction of the inner shroud 27 in response to thermally induced movement of the exhaust struts 31. The individual panels 40 are supported in a ring like configuration by the outer shroud 29 via the struts 31. At least one strut extends from each panel 40. The radially inner end of each strut 31 is connected or joined to an associated panel by any suitable fastening or joining means. Likewise, the radially outer end of the struts 31 is rigidly connected or joined to the outer shroud 29. The inner shroud 27 can thus be viewed as a frameless assembly of acoustic panels, the acoustic panels being structurally supported in position by the struts 31 only. This allows maximizing the surface area covered by the acoustic treatment. Also, it contributes to minimizing the weight of the engine by eliminating the need for dedicated frame members or additional structures for supporting the acoustic panels 40.

The segmentation of the inner shroud 27 allows reducing stress levels resulting from thermal mismatch in the turbine exhaust case 25 and therefore contributes to increasing the component durability. An overlap or any suitable slip joint structure (not shown) may be provided along adjoining edges of the circumferentially adjacent panels 40 to provide for a circumferentially continuous smooth flow surface for the hot gases flowing axially through the exhaust turbine case 25.

Each panel 40 may be provided in the form of an acoustic panel. In this way, an acoustic treatment can be applied substantially along the full axial length of the inner shroud 27 that is from a forward end of the exhaust turbine case 25 to an aft end thereof, thereby providing added sound attenuation as compared to conventional arrangements where the acoustic treatment is applied downstream of the turbine exhaust case 25 to the tail cone 35 or in other non-ducted exhaust areas. According to the illustrated embodiment, the acoustic panels 40 create the inner shroud 27 or the inner ducted wall of the turbine exhaust case 25. As shown in FIGS. 2. and 3, the radially outer surface of the panels 40 form the inner boundary flow surface of the gaspath 33 from a location upstream from the struts 31 to a location downstream thereof. As can be appreciated from FIG. 3, the acoustic panels 40 none only extend axially upstream of the mixer 37 but also axially overlap the mixer 37 to provide sound attenuation along this ducted area as well. Such an arrangement allows providing effective sound attenuation upstream of the mixing plane where the hot gases from the engine core mixes with the compressed air from the bypass passage of the engine. It can also be appreciated that by so increasing the surface area of the acoustic treatment additional sound attenuation can be obtained.

The acoustic panels may have a conventional sandwich structure comprising a core layer of cellular honeycomb like material between two thin metal facing sheets or skins. Such a honeycomb material is stiffer than the metal sheet material typically used to form the outer shroud 29 and the struts 31 and the other sheet metal components of the turbine exhaust case assembly. Therefore, integrating acoustic panels in the turbine exhaust case 25 as proposed above creates a structural strength mismatch. The struts 31 are exposed to the hot gasses flowing through the gaspath 33 and are thus subject to thermal expansion. Being trapped between inner and outer shrouds 27, 29 having different stiffness as well as being exposed to different temperatures important stresses could be created.

Figure 4:
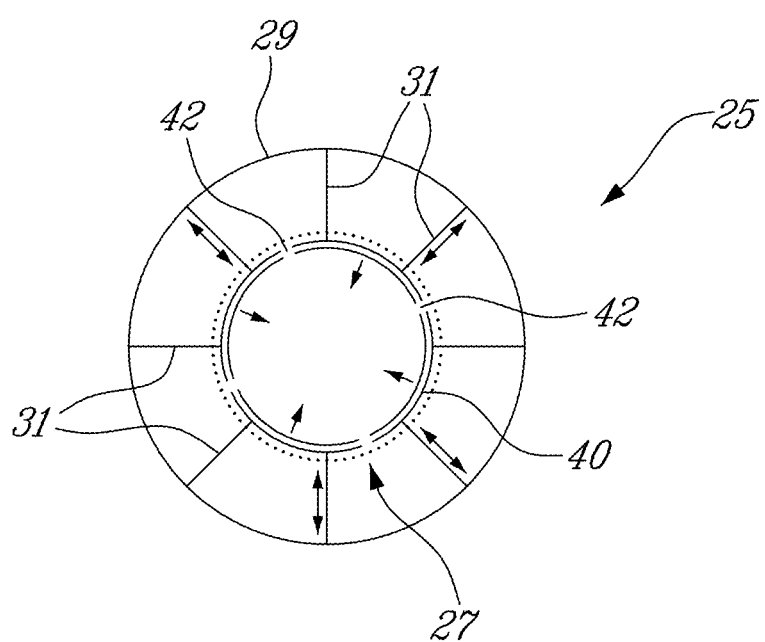
FIG. 4 is an end cross-section view of the turbine exhaust case illustrating the thermal contraction of the segmented inner shroud in response to thermally induced movement of the exhaust struts.

The thermal growth of the struts 31 could result in deformation of the shrouds 27, 29. Such problems are avoided by the segmentation of the inner shroud 27. As can be appreciated from FIG. 4, the individual panels 40 allow the inner shroud 27 to thermally contract and expand between a rest position (shown in dotted line) and a radially inwardly contracted position (shown in full lines) in response to the thermal contraction and expansion of the struts 31. The joints or gaps 42 between the panels 40 act as stress relief features by allowing the inner shroud 27 to radially contract and expand during engine operation. This compensates for the added stiffness of the acoustic panels 40 relative to the outer shroud 29, thereby reducing stress level while at the same time providing for sound attenuation in the turbine exhaust case 25.

The above description is meant to be exemplary only, and one skilled in the art will recognize that changes may be made to the embodiments described without departing from the scope of the invention disclosed. For example, the number of struts 31 per panel 40 could vary. Also it is understood that various panel constructions are contemplated and not only the above described honeycomb sandwich material. Still other modifications which fall within the scope of the present invention will be apparent to those skilled in the art, in light of a review of this disclosure, and such modifications are intended to fall within the scope of the appended claims.

What is claimed is:

1. A turbine exhaust case disposed downstream of a last stage of turbine blades of a turbofan engine for exhausting hot gases to the atmosphere, the engine having an axis, the turbine exhaust case comprising a radially outer annular shroud and a radially inner annular shroud concentrically mounted about said axis and defining therebetween an annular gaspath for channeling hot gases received from the last stage of turbine blades of the engine, a plurality of circumferentially spaced-apart turbine exhaust struts extending radially across the gaspath between the radially outer and the radially inner annular shrouds, at least the radially inner shroud being circumferentially segmented into a plurality of separate arcuate acoustic panels, the exhaust struts being mounted to said separate arcuate panels, each acoustic panel having an acoustic treatment applied substantially along a full axial length thereof.

2. The turbine exhaust case as defined in claim 1, wherein each of said plurality of separate panels has a sandwich structure including a core layer of cellular honeycomb like material disposed between two skins.

3. The turbine exhaust case as defined in claim 1, wherein a radially outer surface of the acoustic panels defines a radially inner flow boundary surface of the annular gaspath.

4. The turbine exhaust case as defined in claim 1, wherein the radially outer annular shroud is of unitary construction.

5. The turbine exhaust case as defined in claim 1, wherein the radially outer shroud is circumferentially continuous and has a stiffness which is different from that of the radially inner shroud, the radially outer shroud being connected to the plurality of separate panels composing the radially inner annular shroud via said exhaust struts.

6. The turbine exhaust case as defined in claim 2, wherein the acoustic treatment extend axially upstream and downstream from the exhaust struts relative to a flow of hot gases passing through the turbine exhaust case.

7. The turbine exhaust case as defined in claim 2, wherein a mixer extends axially aft from said radially outer annular shroud to mix hot gases coming from the turbine section with an outer bypass flow of compressed air, the acoustic panels at least partially axially overlapping the mixer.

8. The turbine exhaust case as defined in claim 7, wherein a tail cone projects axially aft from said acoustic panels of said radially inner shroud.

9. A turbine exhaust case disposed downstream of a last stage of turbine blades of a turbofan engine for exhausting hot gases to the atmosphere, the exhaust case comprising a plurality of arcuate acoustic panels assembled into a circumferentially extending inner shroud with circumferential gaps between adjacent acoustic panels, the acoustic panel having an acoustic treatment applied over substantially all the surface thereof, an outer shroud extending circumferentially about the inner shroud, the inner shroud and the outer shroud defining an annular gaspath therebetween, and a plurality of circumferentially spaced-apart exhaust struts extending radially across the annular gaspath and structurally connecting the acoustic panels of the inner shroud to the outer shroud.

10. The turbine exhaust case defined in claim 9, wherein the exhaust struts are mounted directly to the acoustic panels.

11. The turbine exhaust case defined in claim 9, wherein the acoustic panels have radially inner and radially outer facing surfaces, and wherein the radially outer facing surfaces of the acoustic panels cooperate together to define a flow boundary surface of the gaspath.

12. The turbine exhaust case defined in claim 11, wherein the exhaust struts extend radially outwardly from the radially outer facing surface of the acoustic panels.

13. The turbine exhaust case defined in claim 9, wherein the acoustic treatment extend axially from a forward end of the turbine exhaust case to an aft end thereof.

14. The turbine exhaust case defined in claim 9, wherein a mixer extends axially rearwardly from an aft end of the outer shroud, and wherein the acoustic treatment of the acoustic panels of the inner shroud axially span both the outer shroud and the mixer.

15. A turbine exhaust case disposed downstream of a last stage of turbine blades of a turbofan engine for exhausting hot gases to the atmosphere, comprising a unitary annular outer shroud surrounding a segmented inner shroud including individual acoustic panels disposed circumferentially adjacent to one another with a circumferential play between adjacent acoustic panels, the acoustic panel having an acoustic treatment including a core layer of cellular honeycomb like material, the outer shroud and the inner shroud having a different stiffness, and a plurality of circumferentially spaced-apart exhaust struts connected at a radially inner end thereof to said individual acoustic panels and at a radially outer end thereof to said outer shroud.

16. The turbine exhaust case defined in claim 15, wherein the acoustic treatment extend axially forwardly and aft of the exhaust struts.

17. The turbine exhaust case defined in claim 15, wherein a mixer extends axially rearwardly from the outer shroud, and wherein the acoustic treatment of the acoustic panels axially overlap the mixer.

* * * * *